Figure 1:
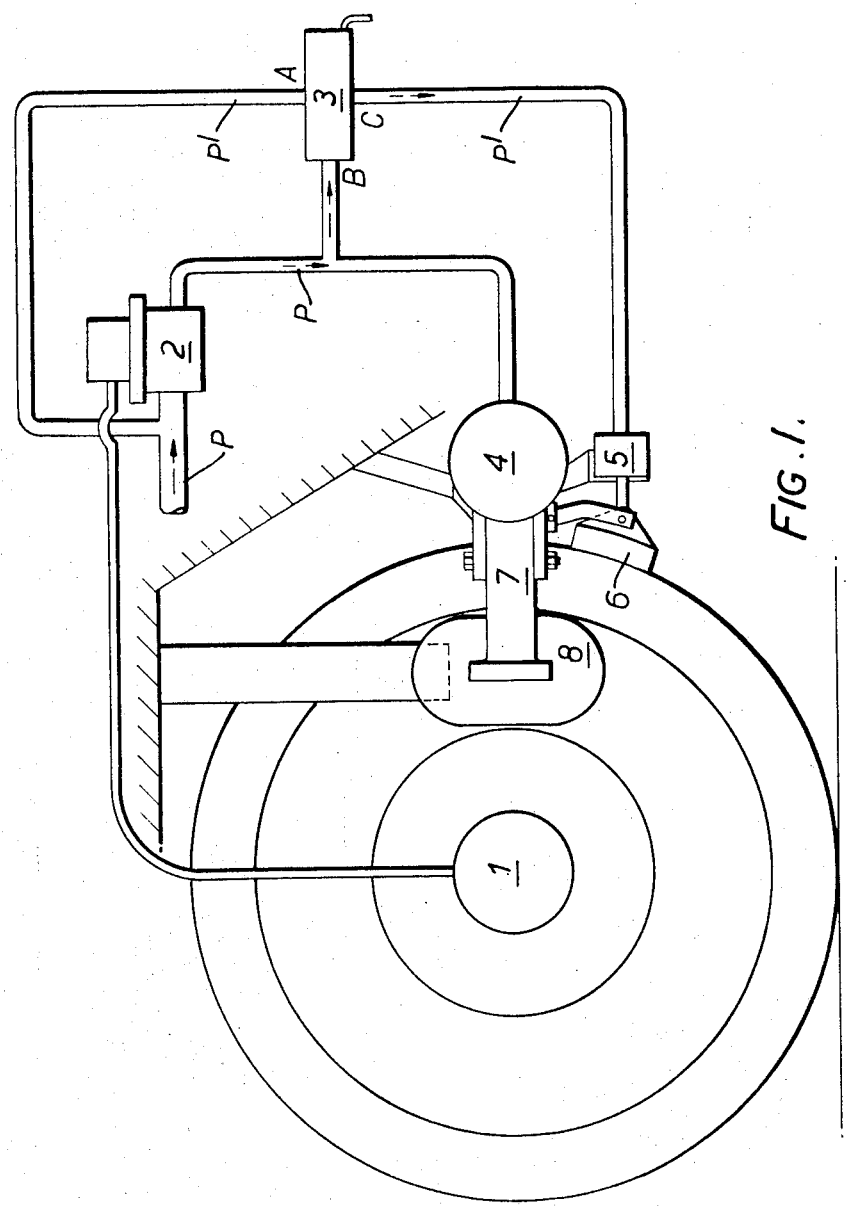

United States Patent
Murphy

[11] 3,777,858
[45] Dec. 11, 1973

[54] RAILWAY VEHICLE BRAKING SYSTEMS

[75] Inventor: Peter Murphy, Tyselex, Birmingham, England

[73] Assignee: Girling Limited, Birmingham, England

[22] Filed: Mar. 28, 1972

[21] Appl. No.: 238,789

[30] Foreign Application Priority Data
Mar. 30, 1971  Great Britain ..................... 8,166/71

[52] U.S. Cl. ............................ 188/181 R, 188/2 R
[51] Int. Cl. .............................................. B60t 8/12
[58] Field of Search ...................... 188/1 R, 2 R, 33, 188/59, 71.1, 81 R, 81 A, 218 R, 218 A, 250 R

[56] References Cited
UNITED STATES PATENTS
1,979,906  11/1934  Saito ............................. 188/2 R X
2,053,302  9/1936  Saito et al. ...................... 188/2 R X
2,496,699  2/1950  Clark ................................. 188/71.1
2,769,509  11/1966  Watts .................................. 188/1 R Primary Examiner—Duane A. Reger
Attorney—Samuel Scrivener, Jr. et al.

[57] ABSTRACT

A railway vehicle braking system comprises a friction brake and a wiper device arranged to wipe the tire of a vehicle wheel or the rail on which the wheel runs to increase the coefficient of friction between the tire and rail. A skid sensing device is operable in response to excessive deceleration of the wheel, when the brake is applied, to reduce the braking effort, and an actuator applies the wiper device in response to operation of the skid sensing device. The wiper may simply clean the tire of grease and moisture, or apply a coating of friction material, or both.

8 Claims, 2 Drawing Figures

RAILWAY VEHICLE BRAKING SYSTEMS

This invention relates to railway vehicle braking systems.

The invention aims at increasing the efficiency of such braking systems, and resides broadly in the provision of a railway vehicle braking system comprising wiper means arranged to be applied to the tire of a vehicle wheel or the rail on which it runs for increasing the coefficient of friction between the rail and the wheel and being operable to wipe the tire or rail without imposing any substantial braking effort even when fully applied, and means responsive to actuation of the wheel brake or of an acceleration or deceleration responsive device to apply the wiper means.

The wiper means may, for example, take the form of a shoe or equivalent member which is applied, in use to the rail just ahead of the braked wheel, or (preferably) to the tire of the wheel. The wiper means may simply be adapted to wipe clean the rail or tire surface by removing moisture, grease or the like, or it may apply an abrasive or other friction increasing coating to the appropriate surface, or it may perform both functions together. The wiper means may be applied automatically in direct response to actuation of the wheel brakes, either immediately or after a predetermined delay or for example when the applied braking effort has reached a predetermined minimum level.

However, we prefer to actuate the wiper means indirectly, in response to operation of skid sensing means incorporated in the system, so that the wiper, means is applied when a predetermined deceleration of the braked wheel is sensed. The skid sensing means may also be caused to effect a reduction of the applied braking effort.

In a particularly advantageous form of the invention, I provide a railway vehicle braking system comprising a friction element for application to a brake rotor surface fast with a vehicle wheel, skid sensing means operable in response to an excessive deceleration of the wheel when the friction element is applied to reduce the braking effort, wiper means for co-operation with the tire of the wheel, the wiper means being adapted to increase the coefficient of friction of the rolling surface of the tire, and an auxiliary actuator for applying the auxiliary wiper means to the tire in response to operation of the skid sensing means without imposing any substantial braking effort.

Figure 2:
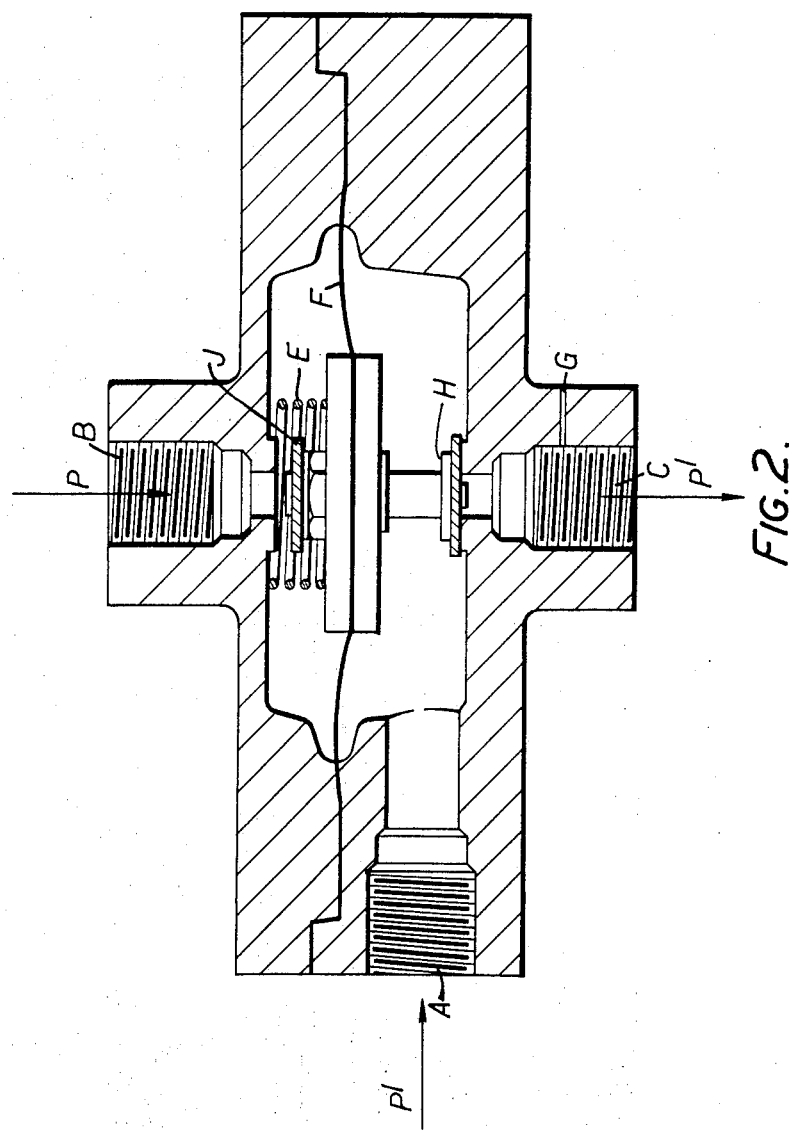

This form of the invention will now be described by way of example with reference to the accompanying drawings, in which:

FIG. 1 is a diagrammatic layout of part of a railway vehicle braking system; and FIG. 2 is an axial section of flow control valve forming part of the system of FIG. 1.

The braking system shown in the drawings comprises a pneumatically operated actuator 4 for actuating a pair of caliper levers 7 carrying friction elements in the form of brake shoes 8 disposed on opposite sides of a wheel having check discs serving as brake rotors. Also supported from the brake structure is a wiper means comprising an auxiliary shoe 6 which is movable towards and away from the tire of the wheel by an auxiliary pneumatic actuator 5.

The auxiliary shoe 6 has a surface adapted to increase the co-efficient of friction of the wheel tire, for example by cleaning or drying it, or applying a friction increasing coating. For this latter purpose, the shoe may have a pad of rapidly wearing and preferably adherent abrasive material.

A pressure line P is connected to the actuator 4 through a normally open electro-pneumatic control valve 2, and to auxiliary actuator 5 through a branch line P$^1$ having inserted therein a pilot operated flow control valve 3 having an inlet port A, outlet port C and pilot supply port B permanently connected to the main pressure line P. Operation of the control valve 2 is governed by a skid sensor 1, for example of the type which produces an electrical output signal when a predetermined deceleration of the wheel is exceeded, indicating that wheel locking is imminent. Operation of the valve 2 cuts off or reduce the pressure downstream of the valve to reduce the braking effort at the wheel brake. With such an arrangement, the pressure applied to the actuator 4 may be reduced and restored repeatedly during a single brake application.

The control valve 3 comprises a poppet valve H attached to a diaphragm F and is normally urged into its closed position (as shown in FIG. 2) in relation to outlet port C by a valve spring E. The port C also has a restricted exhaust bleed G for slow release of any trapped excess pressure. A second valve member J on the poppet co-operates with the inlet port B.

In use, braking operation is perfectly conventional until an incipient skid condition is indicated by sensor 1, whereupon the control valve 2 is operated to reduce or shut off the supply of pressure air to the actuator 4. This causes a reduction of pressure in the pilot chamber of the valve 3, so that the supply pressure through port A acts on the diaphragm F in opposition to the spring E to raise the poppet valve H from its seating and close valve J to cut off air flow from line P. Pressure air now flows through port C to operate the actuator 5, applying the shoe 6 to the wheel tire. The shoe 6 does not impose any substantial braking effort when applied to the tire. If pressure is re-applied through B during repeated anti-skid operation for a given brake application, the valve H will not close since the force resulting from the area of closed valve J receiving pressure through B together with the force of spring E is insufficient to overcome the force resulting from the pressure form P$^1$ acting on the underside of the diaphragm F. The shoe 6 will thus remain applied until the supply pressure through P is cut off or reduced to such a value that the diaphragm spring E, can reclose the poppet valve. Any residual excess pressure in the actuator 5 is relieved through the exhaust bleed G.

If desired, a time delay may be introduced between operation of the control valve 2 and the auxiliarly actuator 5, for example by inserting a restrictor in the line P$^1$ between the valve 3 and the actuator 5.

Although the wiper means of the above-described system is actuated in response to the skid sensor, which also controls the braking effort applied during deceleration, it will be apparent that the wiper means may be actuated independently of the wheel brake. For example, the wiper means may be actuated in response to an acceleration sensor which forms part of the brake system and which is operable to actuate the wiper means if a predetermined acceleration is exceded indicating that wheel slip is imminent.

I claim:

1. In or for a railway vehicle having a plurality of wheels each presenting a tire for co-operating with a rail, a braking system comprising friction brake means for braking at least one said wheel, brake fluid pressure supply means for supplying fluid pressure to said brake means to apply said brake means, skid sensing means operable to sense a predetermined deceleration of said wheel and to adjust the fluid pressure supplied to said brake means to reduce the braking effort, wiper means arranged to be applied to the tire of said braked wheel or the rail on which it runs, and actuating means operable to apply the wiper means, said actuating means being operable in response to operation of said skid-sensing means to apply said wiper means upon said predetermined deceleration of said braked wheel being sensed and consequent reduction of braking effort, said wiper means wiping the tire or rail without imposing any substantial braking effort even when fully applied.

2. A braking system according to claim 1, wherein said actuating means includes an actuator and control valve means which is operable to pass fluid pressure from said brake fluid pressure supply to apply said wiper means when said predetermined deceleration of said braked wheel is sensed, the wiper means being thereafter held applied until the supply of fluid pressure to effect application of said brake means is released.

3. A braking system according to claim 2, wherein said control valve means comprises a pilot-operated valve having an inlet permanently open to said brake pressure supply, an outlet connected to said actuator, a pilot chamber having an inlet, and an internal valve member which normally closes said outlet, the pressure in said pilot chamber being reduced as said braking effort is reduced by operation of said skid sensing means to allow said internal valve member to open said outlet to the brake pressure supply.

4. A braking system according to claim 3, wherein said pilot operated valve includes a diaphragm which defines said pilot chamber and which separates said pilot chamber from said permanently open inlet and said outlet.

5. A braking system according to claim 4, wherein said diaphragm supports said internal valve member, and wherein said pilot chamber inlet is controlled by a further valve member which is supported by said diaphragm so that said valve members are operated in unison.

6. A braking system according to claim 5, wherein said pilot-operated valve includes biassing means which biases said diaphragm to a position in which said outlet is closed and said pilot chamber is opened by their respective valve members, whereby when the pressure in the pilot chamber is reduced and said outlet is opened and said pilot chamber inlet is closed, the said outlet remains open until said brake pressure fluid supply is cut off.

7. A braking system according to claim 3, wherein said skid sensing means comprises a pressure reducer valve connected between said pilot chamber and said brake pressure fluid supply, and means responsive when said predetermined deceleration is sensed to operate said pressure reducer valve to reduce the fluid pressure in said pilot chamber.

8. A braking system according to claim 7, wherein said pressure reducer valve is an electro-pneumatic valve operable in response to electrical signals, and said skid sensing means includes means operable to produce electrical signals at said predetermined deceleration of said braked wheel and to transmit said signals to said pressure reducer valve.

* * * * *